United States Patent [19]

Blair

[11] Patent Number: 5,042,759

[45] Date of Patent: Aug. 27, 1991

[54] SANITARY STAND

[76] Inventor: Robert C. Blair, 2748 Foreman Ave., Long Beach, Calif. 90815

[21] Appl. No.: 498,395

[22] Filed: Mar. 26, 1990

[51] Int. Cl.⁵ .............................................. A47G 29/00
[52] U.S. Cl. ................................... 248/146; 248/907; 220/228
[58] Field of Search ........................ 248/146, 907, 910; 220/228, 69; 47/39

[56] References Cited

U.S. PATENT DOCUMENTS

| 634,677 | 10/1899 | Vaughn | 220/228 |
| 2,297,193 | 9/1942 | Silverman | 248/146 |
| 2,715,005 | 8/1955 | Hilderbrand | 248/907 X |
| 3,119,588 | 1/1964 | Keats | 248/910 X |
| 3,822,845 | 7/1974 | Kennedy et al. | 248/907 X |
| 4,032,097 | 6/1977 | Dwyer | 248/146 |
| 4,343,109 | 8/1982 | Holtkamp | 47/39 X |

Primary Examiner—Alvin C. Chin-Shue
Attorney, Agent, or Firm—Roger A. Marrs

[57] ABSTRACT

A stand or platform is disclosed herein having a barrel or dish supporting base with four legs elevating the barrel or dish from the ground. A pan or individual containers insertably receive the legs of the base and are positioned in spaced-apart relationship with respect to the opposing inner wall surfaces of the pan or containers. A fluid medium is carried in the pan or containers providing a moat preventing the travel of insects and pests from crawling between the pan or container and the base legs. Soapsuds, poison or other inhibitors may be mixed with the fluid medium and an adhesive strip may be used to release the barrel or dish onto the base.

1 Claim, 1 Drawing Sheet

U.S. Patent    Aug. 27, 1991    5,042,759
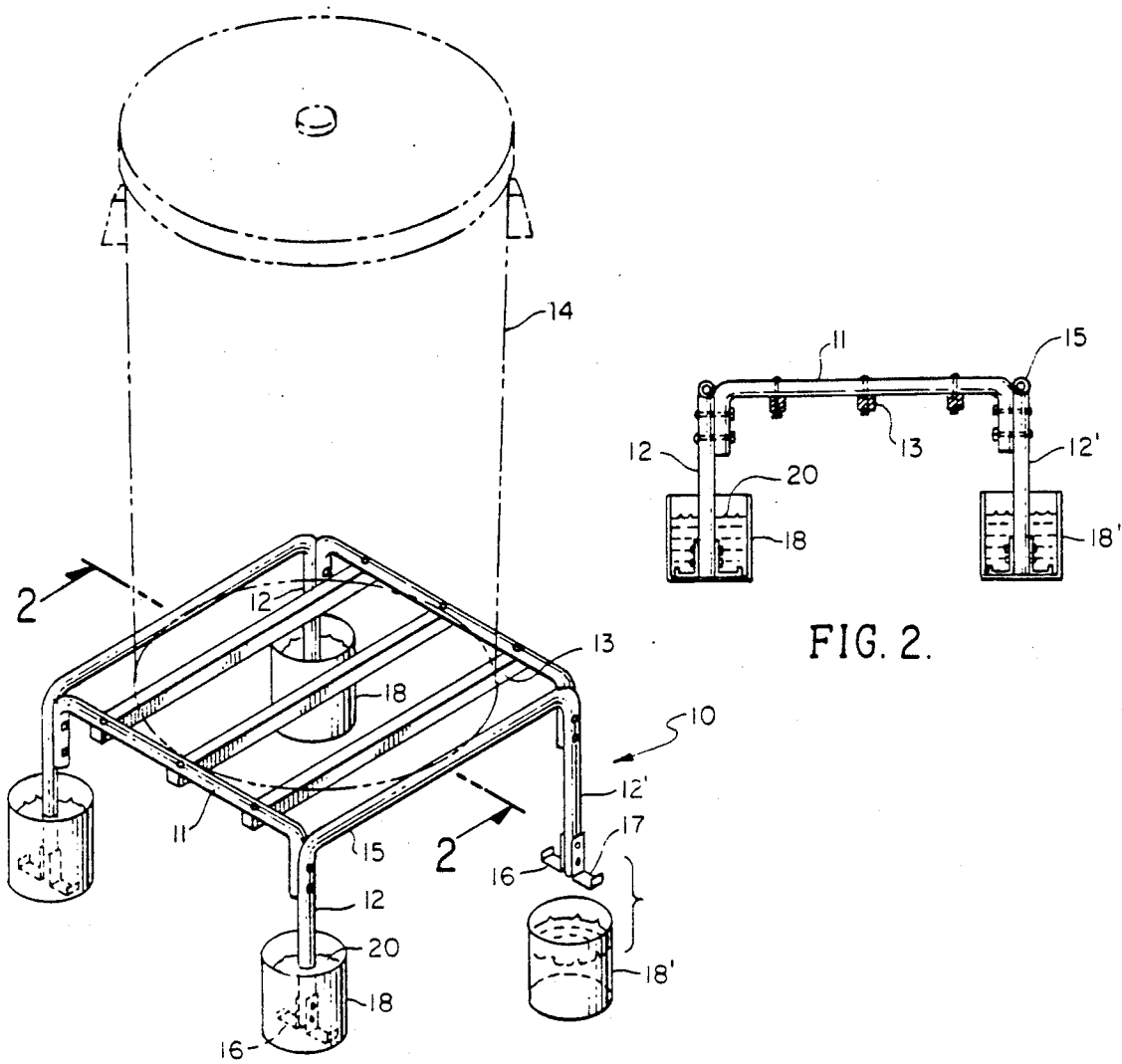
FIG. 1.
FIG. 2.
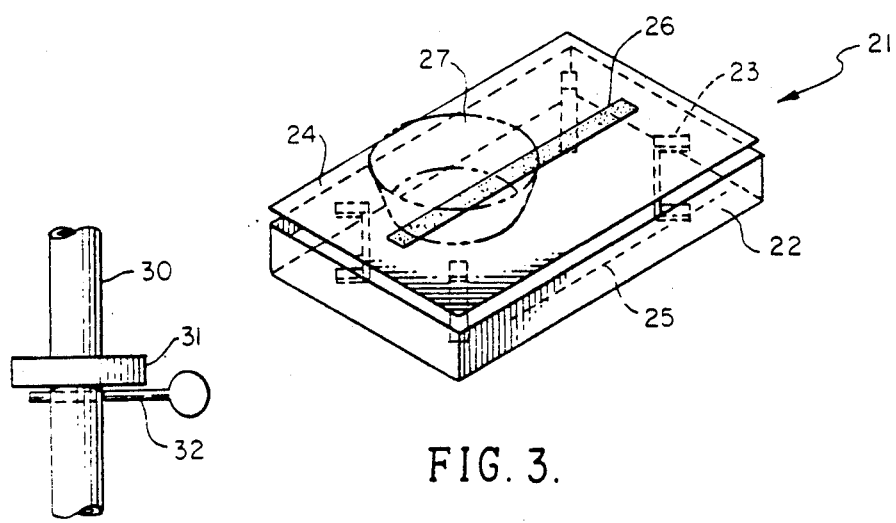
FIG. 4.
FIG. 3.

SANITARY STAND

BACKGROUND OF THE INVENTION

1. Field of the Invention

The present invention relates to the field of sanitary devices, and more particularly to a novel sanitary device maintaining trash barrels, garbage pails, animal food dishes and the like free from crawling insects, such as ants, roaches and other vermin.

2. Brief Description of the Prior Art

In the past, it has been the conventional practice to place trash, refuse, debris and the like into plastic bags for disposal in containers, such as barrels. Usually, the filled barrels or trash cans are located outside of a structure and the contents of the cans and barrels are attractive to crawling pests and insects, such as ants or the like. In other instances, animal food dishes similarly attract pests so that such cans, barrels and dishes are unsightly and unsanitary.

Although some attempts have been made to isolate such trash containers and food dishes by sprinkling disinfectant or other substances about the area to be sanitized, such attempts have not been wholly successful because ants can oftentimes find tracks or trails in which to travel through such barriers. In other instances, attempts have been made to place a water barrier between the attraction and the insect. These attempts have also been unsuccessful inasmuch as many of the insects have the ability to swim, hop or otherwise cross the water barrier even though some insects are prevented from crossing Therefore, a long-standing need has existed to provide a support for barrels and dishes that will releasably hold barrels, cans, dishes or the like, and which will provide a major barrier across which insects cannot travel. Furthermore, such a barrier must not be detrimental to the health or safety of animals or persons coming into contact with the barrier or in close proximity therewith.

SUMMARY OF THE INVENTION

Accordingly, the above problems and difficulties are obviated by the present invention which provides a novel platform having a base with support legs or stanchions that rest in containers or a single container, such as a pan, that holds a quantity of a liquid medium saturated with a foaming substance detrimental to insects. In one form of the invention, the pan or containers hold a quantity of water with soapsuds and which also may include a fragrant substance or a poisonous substance detrimental to insects. Also, means may be provided for releasably holding cans, barrels or dishes onto the platform of the base so that such cans, barrels or dishes may be easily removed when it is time to empty its contents. The legs or stanchions of the base are critically located so that they are completely surrounded by the liquid medium and are arranged in fixed spaced-apart relationship with respect to the opposing sidewalls of any pans or containers so that the insects cannot jump or hop across the liquid medium barrier.

Therefore, it is among the primary objects of the present invention to provide a novel means for retarding or preventing insects from reaching the contents of trash barrels, animal food dishes or the like so that unsightly and unsanitary conditions ar avoided.

Another object of the present invention is to provide a novel means for supporting trash barrels or food dishes in such a way that insects are preventing from reaching the can or dish.

Still a further object of the present invention is to provide a novel platform having downwardly depending legs or stanchions which are immersed in a liquid medium serving as a barrier for preventing the crossing of insects from a surrounding area into the contents of the trash or food in a dish.

Another object of the present invention is to provide a relatively inexpensive and economic means for providing a sanitary barrier about animal food dishes and trash barrels whereby crawling insects are prevented from reaching the contents of cans, barrels or animal food dishes.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of the novel sanitary stand or platform incorporating the present invention;

FIG. 2 is a cross-sectional view of the sanitary stand shown in FIG. 1 as taken in the direction of arrow 2—2 thereof;

FIG. 3 is a front perspective view of another version of the present invention incorporating the novel stand as a means for supporting an animal food dish; and FIG. 4 is a side elevational fragmentary view of another version incorporating the novel inventive concept employing a solid medium barrier.

DESCRIPTION OF THE PREFERRED EMBODIMENT

Referring to FIG. 1, the novel sanitary stand of the present invention is indicated in the general direction of arrow 10 and includes a base comprising a horizontal platform 11 having at least four downwardly depending leg or stanchion members, such as indicated by leg 12. The platform 11 includes opposite side members joined by cross braces, as indicated by numeral 13, so that a rigid support is provided upon which trash barrels or cans, as indicated by numeral 14, may be placed. The barrel or can 14 is removably carried on the brace members 13 and the load is transferred via the cross braces to the side members 11 and through the legs or stanchions 12 to the ground.

For ease and convenience of construction, tubular construction may be employed in that the side members 11 form a U-shaped tubular construction that joins with opposite tubular constructed leg members as indicated by numeral 15, so that a raised platform construction ensues. The opposite ends of each of the side members 11 are joined to the U-shaped member 15 by screws or other construction which is conventional and convenient.

It is to be particularly noted that each of the legs 15 includes a foot portion comprising outwardly projecting elements 16 and 17 which are fastened to the extreme terminating end of each leg or stanchion. The foot elements are intended to be placed into a container, such as indicated by numerals 18 and 18', that is filled with a liquid medium, as indicated by numeral 20. Therefore, as viewed in the illustrations, the leg or stanchion 12 is separated from the opposing inner surface of the container 18 by a liquid barrier over which crawling insects cannot travel. Preferably, the liquid medium may take the form of water which is mixed with a soap compound so that a foamy or frothy surface is provided that will discourage crossing by such insects. In other instances, insect poison or deterrant may be included in the liquid medium as a substance to prevent or discourage insects to cross.

Referring now in detail to FIG. 2, it can be seen that the foot of each leg, indicated by numerals 12 and 12', is completely submerged into its respective container 18 or 18'. The critical or strategic location of the respective legs or stanchions within the liquid medium is important so that a fixed spaced-apart relationship is established between the exterior of the legs or stanchions and the inner wall surface of the container 18. Also, the foot portion of each leg is preferably of a proportional size to support the load carried on the platform so that the load will not topple or otherwise tumble from the platform o base construction.

Referring now in detail to FIG. 3, another version or embodiment of the invention is illustrated in the direction of arrow 21 which includes a walled pan 22 containing a liquid medium into which supporting legs 23 hold a platform 24. At least four legs are strategically stationed and affixed to the corners of the square platform 24 so that the platform is raised above the edge marginal region of the walls carried on the pan 22. Therefore, a substantial air gap exists between the pan and the platform 24 and the supporting legs 23 are critically located so that the liquid medium within the pan, as indicated by liquid level 25, constitutes a barrier over which crawling insects cannot travel. As described above, the liquid medium may contain a soap compound to provide suds or any other substance which will deter contact with crawling insects.

In either version 10 or 21, releasable means may be provided for supporting a container on the platform 24. In the instance shown in FIG. 3, an adhesive strip 26 is critically located across the center of the platform 24 intended to engage the underside of surface of a container, such as an animal food dish 27. In this manner, the pan 22 may be placed on a slope or other non-level surface and the food dish 27 will not topple or fall from the platform.

It is to be understood that the platform 10 or 21 may be useful in supporting a variety of containers such as trash barrels, trash cans, animal food dishes, or the like, without departing from the present invention. Also, it is to be understood that a variety of constructions may be employed other than tubular, such as is set forth in embodiment 21 in FIG. 3.

The inventive concept also includes any ant control medium placed in close proximity to the legs of the platform. Such medium may take the form a solid stick of ant repellant, poison or the like so that the insect or ant is attracted to the solid stick or pad rather than to the platform leg. The solid medium may be used in combination with the leg. FIG. 4 shows a base platform leg 30 with a container 31 holding a quantity of solid pad, cake or stick of ant poison. The container is releasably held in place by an insertable retaining pin 32. The solid medium provides a barrier to the crossing of ants in a similar manner as the aforementioned liquid medium.

When a liquid medium is used, the liquid may be mixed with any insect deterrent with or without a foamy or frothy surface or layer. An example would be to include a petroleum product with water which would not produce a foam or suds and yet repel or deter the travel or crossing of the surface.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A stand for preventing the attraction of prests and insects comprising the combination of:

a platform having a plurality of downwardly depending integral legs for supporting said platform in an elevated position above the surface of the ground or flooring;

at least one walled container for insertably receiving said platform legs within a continuous sidewall thereof, wherein each leg is associated with a separate container and is in fixed spaced-apart relationship with respect to said sidewall of each respective one of said walled containers;

a liquid medium disposed in each of said respective containers surrounding said legs to establish a liquid barrier preventing the transit of pests and insects;

a frothy substance mixed in said liquid medium covering the surface thereof establishing a surface barrier on said liquid barrier;

said substance is selected from at least one of the following:
a. soap solution;
b. poisonous compound
c. scented compound
d. petroleum product
e. other insect deterrent;

each leg of said plurality includes a foot member of wider surface area than said leg for conducting load forces directly to said ground or flooring from said container via said respective containers;

means carried on said platform for releasably securing said container thereto;

utilizing gravity forces to urge said platform leg and and foot members into static position on said ground or flooring in load transference relationship; and said platform includes a peripheral edge marginal region in spaced relationship with respect to each of said respective walled containers.

* * * * *